United States Patent [19]

Tijburg et al.

[11] Patent Number: 4,968,660

[45] Date of Patent: Nov. 6, 1990

[54] CATALYST-ON-CARRIER FOR THE NON-SELECTIVE OXIDATION OF ORGANIC COMPOUNDS

[75] Inventors: Ivo I. M. Tijburg, Utrecht; John W. Geus, Bilthoven, both of Netherlands

[73] Assignees: VEG-Gasinstituut N.V., Apeldoorn, Netherlands; Gaz de France, Paris, France

[21] Appl. No.: 305,604

[22] Filed: Feb. 1, 1989

[30] Foreign Application Priority Data

Feb. 2, 1988 [NL] Netherlands .................... 8800252

[51] Int. Cl.$^5$ .................... B01J 23/34; B01J 23/72; B01J 23/74; B01J 32/00
[52] U.S. Cl. .................... 502/303; 502/302; 502/304; 502/324; 502/332; 502/335; 502/336; 502/346; 502/439
[58] Field of Search ............... 502/303, 346, 439, 302, 502/304, 324, 332, 335, 336

[56] References Cited

U.S. PATENT DOCUMENTS

| | | | |
|---|---|---|---|
| 3,226,340 | 12/1965 | Stephens et al. | 252/465 |
| 3,899,444 | 8/1975 | Stephens | 502/302 X |
| 4,113,658 | 9/1978 | Geus | 252/454 |
| 4,613,584 | 9/1986 | Schneider et al. | 502/306 X |
| 4,722,920 | 2/1988 | Kimura et al. | 502/439 |
| 4,808,564 | 2/1989 | Matsumoto et al. | 423/213.5 X |

FOREIGN PATENT DOCUMENTS

2739466  7/1974  Fed. Rep. of Germany .

OTHER PUBLICATIONS

"Influence of Surface Area and Additives on the Thermal Stability of Transition Alumina Catalyst Supports I: Kinetic Data", P. Burtin, et al, Applied Catalysis 34 (1987) 225–238, Elsevier Science Publishers B.V., Amsterdam.

"The Influence of Lanthanum Oxide on Nickel-/Alumina Methanation Catalysts", Schaper, Thesis 1984, Delft, pp. 73–75.

"Specific Adsorption of Co(II) and [Co(III)EDTA]—Complexes on Hydrous Oxide Surfaces", Huang and Lin, published in Adsorption from Aqueous Solution, Plenum Press, 1981, N.Y., pp. 61–91.

*Primary Examiner*—W. J. Shine
*Attorney, Agent, or Firm*—Weingarten, Schurgin, Gagnebin & Hayes

[57] ABSTRACT

A catalyst for conducting non-selective oxidation reactions comprising a carrier material consisting mainly of alumina, if required in combination with one or more other metal oxides, the surface of said carrier material having applied thereto a catalytically active component consisting in a fine distribution of one or more oxides of one or more metals from the first series of transition elements of the Periodic Table, said carrier surface having applied thereto a stabilizing element on the basis of a metal or compound of a metal from subgroup 3 or 4 of the Periodic Table, said element being applied so uniformly that after treatment at 1050° C. for 6 hours the catalyst shows no diffraction maxima in the X-ray diffraction pattern having a half-value width less than 1.0 degrees of arc (measured through the double angle of diffraction).

13 Claims, 2 Drawing Sheets

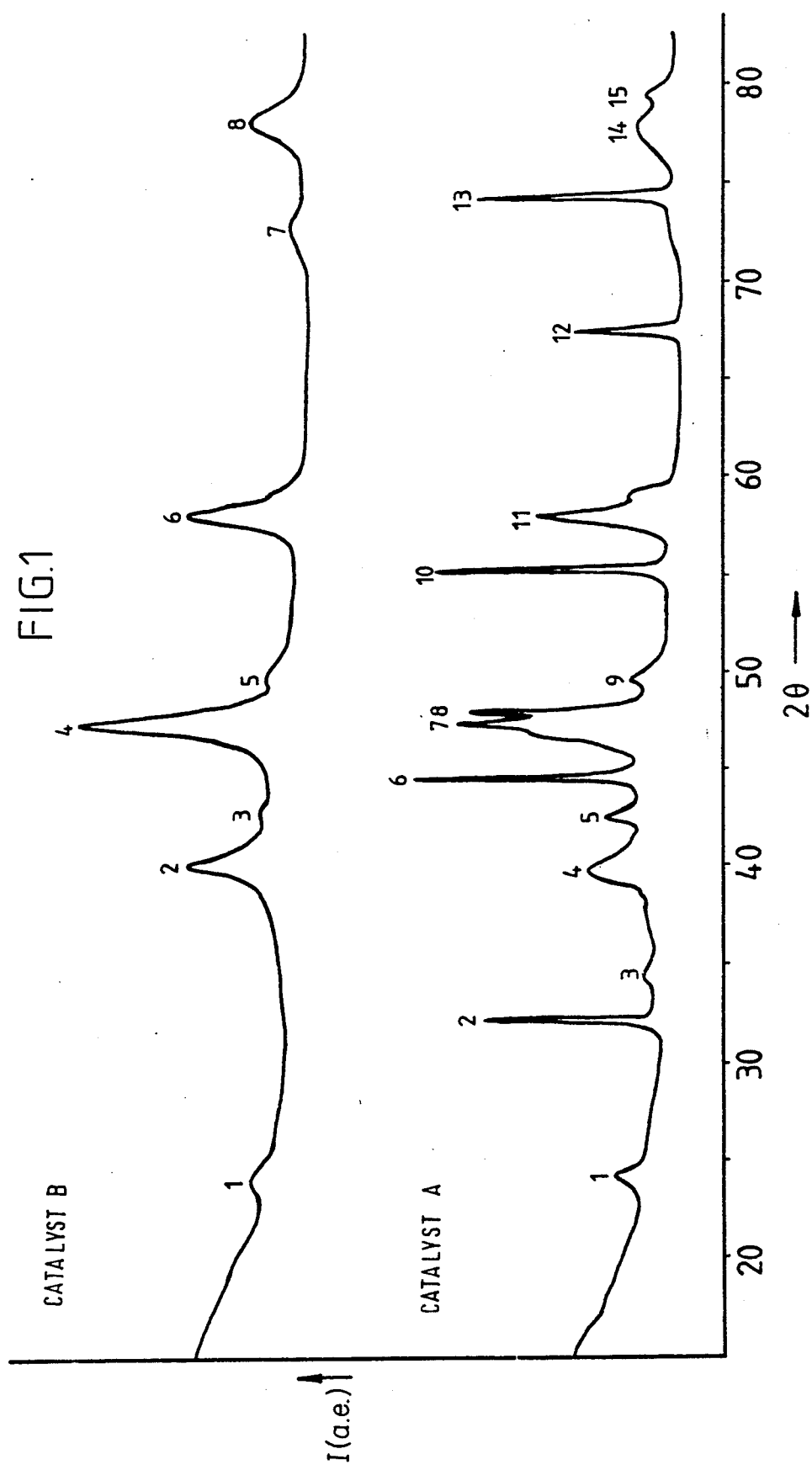

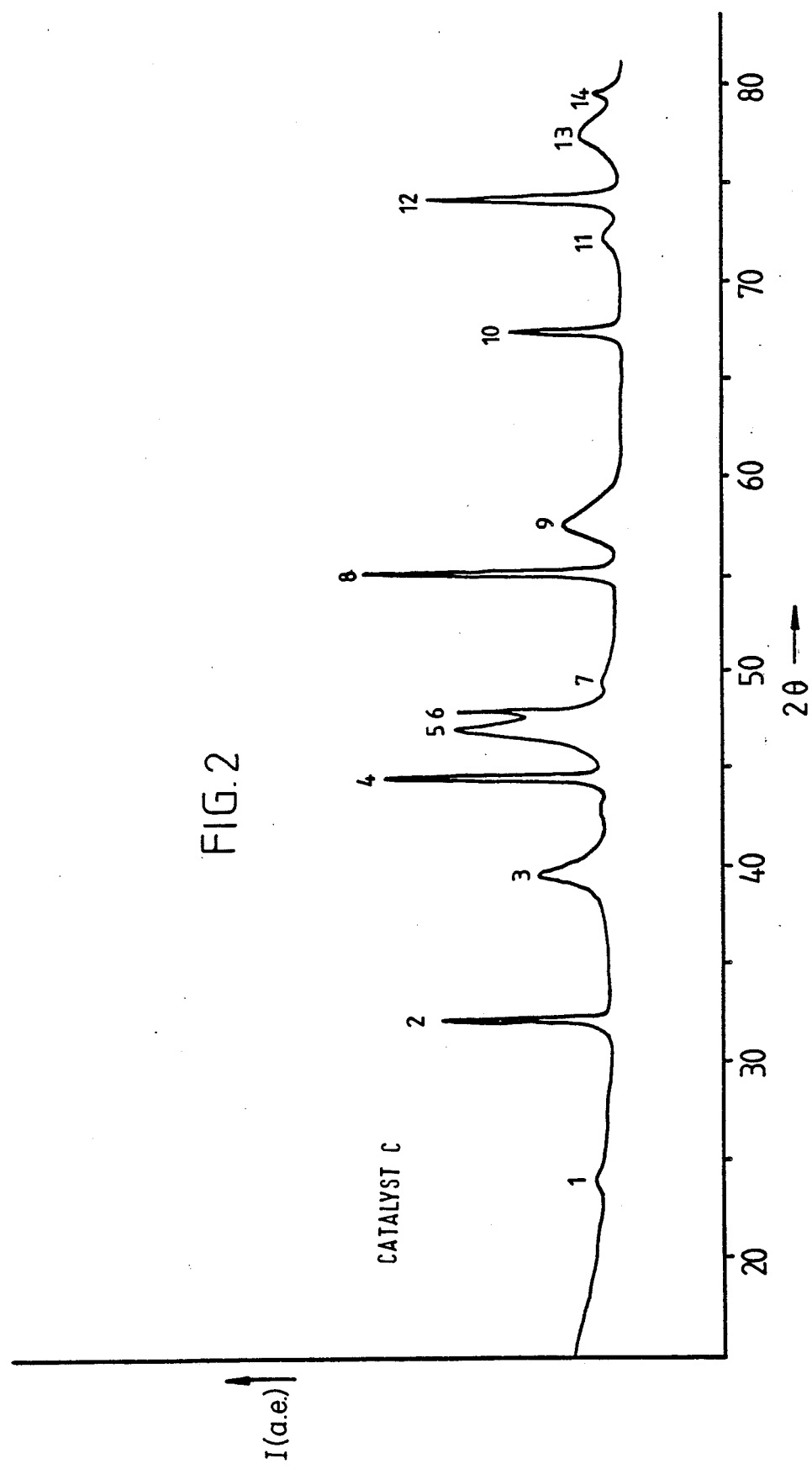

CATALYST-ON-CARRIER FOR THE NON-SELECTIVE OXIDATION OF ORGANIC COMPOUNDS

This invention relates to a catalyst-on-carrier for conducting non-selective oxidations and to a process for the non-selective oxidation of, in particular, organic compounds.

In principle, any fuel can be burned to form $CO_2$ and/or $H_2O$, the reaction heat being released as thermal energy. In general, such a combustion takes place in the flame. The high flame temperature and the fact that the combustion takes place in the gaseous phase causes nitrogen oxides to be released. Furthermore, when gaseous fuels are used, the amount of combustion air is to be continuously adapted to the composition of the gas to be burnt. The use of catalysts in the non-selective oxidation of chemical, in particular organic, compounds can meet the above drawbacks. Because of the fact that the oxidation reaction can then be conducted in a lower range of temperature, the formation and emission of nitrogen oxides can be much better controlled. Moreover, in certain cases the thermal energy produced in the oxidation reaction can be discharged and utilized more easily.

In the oxidation of compounds, such as methane, higher alkanes or alcohols, noble metal catalysts are often used. These catalysts show a high activity even at lower temperatures. A drawback of noble metal catalysts is the higher cost price, even if they are applied to a carrier in finely divided form. For the oxidation of specific reactive molecules especially hydrogen and carbon monoxide, the above noble metal catalysts can in principle be replaced by oxides of less noble metals. Catalysts based on these oxides, however, have a considerably lower activity than noble metal catalysts.

Trimm, Catalytic Combustion (Review), Applied Catalysis 7 (1983), pages 249–282, gives a comprehensive survey of the use of catalytically active materials for the combustion of, among other things, hydrocarbons. As appears from the table on pages 260 and 261 of this article, the research in this field has been directed chiefly to noble metal catalysts.

The object underlying this invention was to provide a catalyst for the above described non-selective oxidation, which is sufficiently active at relatively low temperatures, and the use of which is not limited by the high cost price.

Within the framework of the research leading to the present invention it was found that there are a number of reasons for which oxidation catalysts based on oxides of base metals ar applicable only to a limited extent. In general, combustion catalysts must function at reaction temperatures above 500° C. in view of the discharge of the thermal energy produced. Finely divided oxides of the above metals will then be rapidly sintered. The resulting decrease of the active surface per unit volume of catalyst will lead to an unallowable reduction of the activity. Considered by itself, it is conventional to apply catalytically active components to highly porous thermostable carriers. Under the conditions prevailing in catalytic combustion the finely divided active oxides often react with the carrier material to form inactive or much less active compounds, especially metal silicates or metal aluminates. These reactions do not take place with noble metal catalysts, so that these retain their activity at higher temperatures.

An illustrative example of such an undesirable reaction is constituted by the reaction of nickel oxide with alumina to form nickel aluminate. At the high reaction temperature nickel aluminate can develop, which compound has a negligible activity.

Another example is the use of cobalt oxide as a catalyst. In order to obtain a sufficient activity, the cobalt oxide must be applied to alumina. However, the cobalt oxide will also here react with the alumina to form a spinel, cobalt aluminate, having a low activity.

Furthermore, it is often observed that the presence of a catalytically active oxide accelerates the reaction of the alumin to $\alpha$-alumina having a negligible surface. When the carrier is not too much loaded with an oxidically active component, the conversion to $\alpha$-alumina is often more extensive than the reaction to an aluminate.

For this reason all kinds of measures have been studied to prevent or inhibit the reaction with the carrier and the recrystallization to $\alpha$-alumina.

According to this invention there is provided a catalyst for conducting non selective oxidations reactions, comprising a carrier material consisting mainly of one or more metal oxides, the surface of said carrier material having applied thereto a catalytically active component showing a fine distribution of one or more oxides of one or more metals from the first series of transition elements of the Periodic Table, said carrier surface having applied thereto a stabilizing element on the basis of a metal or compound of a metal from subgroup 3 or 4 of the Periodic Table, said element being applied so uniformly that after treatment at 1050° C. for 6 hours the catalyst shows no diffraction maxima in the X-ray diffraction pattern having a half-value width of less than 1.0 degrees of arc (measured through the double angle of diffraction). More in particular, after heating for 24 hours at 1000° C. in an oxidizing gas said catalyst shows no or substantially no distinguishable lines of metal aluminate in the X-ray diffraction pattern.

In this connection the half-value width of a diffraction maximum is to be taken to mean the width half-way up the maximum expressed in degrees of arc.

As a carrier material all the alumina-based carrier materials known for non-selective oxidation catalysts are suitable in principle. Examples of metal oxides for the carrier material that can be combined with alumina comprise $SiO_2$, MgO and ZnO.

In general, the alumina will form at least half of the combination of alumina and optionally applied other metal oxides. Preferably, the carrier material consists of only $Al_2O_3$. Suitable as catalytically active components are in particular oxides of Mn, Fe, Co, Ni and Cu. When the catalytically active oxide is applied to the carrier material, it is important that this oxide is and remains in finely divided condition, that is to say uniformly distributed over the surface and at a very small particle size. This can be effected, among other things, by using controlled precipitation or adsorption techniques. As appears from the Periodic Table of Elements as defined in IUPAC, Nomenclature of Inorganic Chemistry 1970 (Definitive Rules 1970) London 1970, there can be selectively applied according to this invention, among other things, yttrium, zirconium, scandium, niobium, lanthanum, hafnium and tantalum, as well as the lanthanides. Preference is given to lanthanum and lanthanide, zirconium and titanium, because the best stabilization against undesirable reactions is obtained with these elements.

Surprisingly, it has been found that the catalyst according to this invention may show at least the same activity as a noble metal catalyst-on-carrier. It has further been found that when the catalyst according to this invention is used for carrying out non-selective oxidation reactions, also at elevated temperatures, there will be no sintering of the catalytically active components, nor a reaction between the active component and the carrier material to form compounds that are catalytically inactive or less active.

It is observed that there have been earlier proposals for solving the problem caused by the reaction of a catalytically active component or precursor thereof with a carrier material. Thus, for instance, a catalyst was proposed for the methane/steam reform reaction, in which the carrier material has a spinel structure, namely, magnesium aluminate in spinel form. This material, however, proves to disintegrate, so that, e.g. nickel oxide reacts with either the magnesia or the alumina to form a substantially inactive compound. Surprisingly, it has been found that these problems do not occur with the catalyst according to the present invention.

Burtin et al., Influence of Surface Area and Additives on the Thermostability of Transition Alumina Catalyst Supports. I: Kinetic Data, Applied Catalysis, 34 (1987), pages 225-238, describe the influence of the surface and of additives on the conversion of different transition alumina into α-alumina on the basis of several methods. From this publication it appears that the conversion into α-alumina was enhanced by a high-specific surface area of the original alumina. This analysis also showed that zirconium, calcium, thorium and lanthanum ions acted as inhibitors to the conversion into α-alumina. From this it could be concluded that the addition of these metal ions can effect a thermal stabilization of the catalyst.

German Patent Application No. 27 39 466 discloses a catalyst consisting of nickel and/or cobalt oxide, lanthana and/or ceria and alumina, which catalyst is used in the production of methane-containing gases. The catalyst described in this publication is obtained by precipitating, together or separately, the different oxides from aqueous solutions of soluble metal salts. According to the specification the three-stage precipitation of the salts is most preferred, because this method leads to the best results. This means that first alumina is prepared by precipitating aluminium from an aluminium nitrate solution, then lanthana is precipitated on this alumina from a lanthanum nitrate solution, and finally nickel oxide is precipitated on the lanthanum and aluminum containing product by precipitating from a nickel nitrate solution. Thus, catalysts are obtained having 60-90% by weight of nickel oxide, 5-30% by weight of lanthana. The good action of this catalyst is attributed to the specific production conditions.

Schaper, Thermostable Ni-alumina catalysts, dissertation 1984, Delft, pages 73-75, mentions the addition of lanthana to nickel alumina methanation catalysts. In his discussion of the literature he states that different publications refer to the addition of lanthana to suppress sintering, carbon deposition and nickel aluminate formation.

A further analysis of the different materials described as a suitable stable carrier material has taught, however, that the thermal stability has been properly improved indeed, but that especially the stability against undesirable reactions of the carrier material with the catalytically active component or precursor thereof is insufficient, so that a fine distribution of the catalytically active component is lost.

In Schaper's publication it is further stated that the addition of lanthana would suppress the formation of nickel aluminate. Apart from the fact that this only relates to the formation of nickel aluminate, it has also been found that with the normal lanthana-containing alumina carrier materials this reaction is only slightly suppressed, which results in a loss of the necessary fine distribution.

BRIEF DESCRIPTION OF THE DRAWINGS

FIG. 1 is a comparison of the X-ray diffraction patterns of comparative catalyst A with that of the catalyst of the present invention, catalyst B.

FIG. 2 is the X-ray diffraction pattern of a non-stabilized catalyst, catalyst C.

In the catalyst according to this invention the effect of the addition to the stabilizing element can be excellently observed. Thus, for instance, it was found in practice that the catalyst according to the invention, whose carrier consisting of $\gamma$-$Al_2O_3$ was stabilized with lanthana, and to which CuO was applied as a catalytically active component, showed no distinguishable lines of $\alpha$-$Al_2O_3$ and no or substantially no distinguishable lines of copper aluminate in the X-ray diffraction pattern after heatinq for 24 hours at 1000° C., and furthermore, no metal aluminate lines were present after heating for 24 hours at 600° C. in an oxidizing gas. An analysis of the catalysts using electron microscopy (selective area electron diffraction) further showed that during this thermal treatment no $\alpha$-$Al_2O_3$ particles or copper aluminate particles having sizes greater than 0.1 $\mu$ can be found. The same was found for the other oxides of metals of the first series of transition elements, such as cobalt or nickel.

Although this invention cannot be considered limited by any theoretical reflection, it may be assumed that the application of the stabilizing metal or the stabilizing compound of a metal from subgroup 3 or 4 of the Periodic Table to the surface of the carrier material gives rise to a crystallographic conversion of the surface, so that it does not react or substantially no longer reacts with the catalytically active material or the precursor thereof.

In this connection the term "uniformly applied" is to be taken to mean that per unit of area of the carrier material, e.g., per 100 $Å^2$ a substantially equal number of metal ions of the 3rd or 4th subgroup are present. It is therefor not essential that a monolayer of stabilizing metal ions is present. Much less ions will do, provided these are uniformly distributed over the surface of the carrier material, and a sufficient number of them must be present to avoid the crystallographic conversion of the total surface area into the undesirable crystal form.

It is observed with respect to these carrier materials that it will often be impossible to identify the original carrier material and the stabilizing compound of metal ions of the 3rd or 4th subgroup as a separate compound. It will rather be a question of including the metal ions in the lattice of the metal oxide of the carrier material. The amount of the compound of the further defined element may vary within wide limits, provided the distribution is uniform. In general, this amount will be at least 0.1% by weight, calculated as an oxide, more in particular range from 0.1 to 25% by weight, based on the carrier material. Amounts larger than 25% by weight have no advantage, nor do they act to a disadvantage as such either.

The catalyst-on-carrier according to the present invention can be produced by a conventional method of applying to the stabilized carrier an oxide of the metal from the first series of transition elements of the Periodic Table, with the metal of the oxide to be applied differing from the metal of the stabilizing compound or the stabilizing element. Suitable methods are deposition precipitation using pH change, e.g., by adding caustic soda or by an electrochemical process, followed by separating, drying and, if required, calcining the catalyst. In general, an amount of catalytically active material ranging from 0.1 to 30% by weight, bases on the catalyst, will be contemplated.

The stabilized carrier material is obtained by precipitating on or adsorbing to a suitable carrier material the desired metal compound or a precursor thereof. According to one embodiment of this process this metal compound is applied by adsorption of a complex of the relevant metal ion in aqueous solution at a constant pH. This adsorption can be effected at a pH of 4–10, with the degree of adsorption also being determined by the selection of the pH. In this connection reference is made to the article by Huang and Lin, Specific Adsorption of Cobalt (ii) and (CO(III)-EDTA)$^-$-complexes on Hydrous Oxide Surfaces, published in Adsorption from Aqueous Solution, Plenum Press, 1981, New York, pages 61–91. It is assumed that the mechanisms proposed in this publication for the adsorption also apply to the metal ion of the 3rd and 4th subgroup as used in the present invention.

For the complexing agent to be used reference may be made to the conventional complexing agents known in the art, such as EDTA (ethylenediaminetetraacetic acid), EGTA (ethylene glycol bis($\beta$-aminoethylether)-N,N,N',N'—tetracetic acid), citrates, oxalates and the like.

After the adsorption, which generally may take from 0.5 minutes to 5 hours, the liquid is separated from the solid matter. This may be effected by a known method, such as filtration, decantation and centrifugation. The wet carrier material is then generally dried to remove the liquid and, if necessary, is subjected to a heat treatment so as to obtain the desired oxide form. In general, this heat treatment takes place at a temperature ranging from 150 to 600° C. for a period of from half an hour to 24 hours.

According to another embodiment the compound of the metal ion from the 3rd or 4th subgroup of the Periodic Table can be applied to the metal oxide carrier material by homogeneous deposition precipitation as described in U.S. Pat. No. 4,113,658, which description is inserted herein by reference.

The further treatment of the carrier material after the homogeneous deposition precipitation may take place as described in relation to the first embodiment of this invention.

The amount of the compound from the metal ion from the 3rd or 4th subgroup of the Periodic Table may be influenced, as indicated above, by the selection of the pH, if adsorption of a complex is started from. In the homogeneous deposition precipitation the degree of loading can be determined by the amount of compound precipitated from the solution. Another possibility of varying the degree of loading resides in that the applying step is repeated two or more times. Thus, very high degrees of loading can be obtained, although this will not be necessary in general.

This invention also relates to a process for the non-selective oxidation of organic compounds, such as methane but also waste gases, combustion gases etc., using the above described catalyst. It is observed that the catalyst is then used in oxidized form.

Such processes are particularly important to the "flameless combustion" of hydrocarbons for generating electricity, heat, power etc.

The invention will now be illustrated by some non-limitative examples.

EXAMPLE I 20 g $\gamma$-Al$_2$O$_3$ (Al 4172, 265 m$^2$/g, pore volume 1.14 ml/g), sold by Harshaw B.V., were suspended in 750 ml deionized water of 30° C. The pH was adjusted to 5 by means of concentrated HNO$_3$. 1.95 g EDTA (ehtylenediaminetetraacetic acid) were dissolved in 50 ml deionized water by dropwise adding concentrated ammonia, with the pH being prevented from falling below 4. 2.69 g La (NO$_3$)$_3$. 6H$_2$O (corresponding to a final loading of 5% by weight of La$_2$O$_3$) were dissolved in 5 ml deionized water and cautiously added dropwise to the EDTA solution. The pH was maintained between 4 and 7 by dropwise adding diluted ammonia. The final solution was poured into the aqueous suspension of $\gamma$-Al$_2$O$_3$. The pH was adjusted again to 5 by dropwise adding the diluted HNO$_3$. For one hour the suspension was vigorously stirred, and the pH was kept constant by injecting diluted HNO$_3$ under the liquid surface. After one hour the suspension was filtered off and washed twice with 25 ml deionized water. The carrier material was then dried at 60° C. for 16 hours. The dried carrier material was calcined for 5½ hours in the air at a temperature of 550° C. so as to convert the lanthanum complex into oxidic form. The carrier material eventually contains 3% by weight of Al$_2$O$_3$. 15 g of this stabilized carrier were suspended in 750 ml deionized water of 30° C. 5.16 g CU (NO$_3$)$_2$. 3H$_2$O were dissolved in 50 ml deionized water and added to the suspension. The suspension was vigorously stirred while N$_2$ was blown under the liquid surface. The pH was adjusted to 4 with concentrated HNO$_3$. By injecting 0.5 M NAOH solution .(0.3 ml/min) under the liquid surface the pH was increased to 12. After 16 hours the catalyst was filtered off and washed twice with 25 ml deionized water. The catalyst was dried for 23 hours at 60° C. After heating in oxidizing gas for 24 hours at 600° C. no copper aluminate lines can be shown in the X-ray diffraction pattern.

EXAMPLE II

The catalytic activity of the above catalyst (10% by weight of CuO/Al$_2$O$_3$) in the oxidation of methane was tested in a solid bed reactor. The catalyst was compressed at a pressure of 150 MPa and then sieved until a sieve fraction of 500–850 $\beta$m was finally formed. The reactor was loaded with 0.6 g of this sieve fraction. A gaseous mixture (1% by volume of CH$_4$, 4% by volume of O$_2$, 95% by volume of Nhd 2) was passed over the catalyst. The spatial rate of flow was 3000 h$^{-1}$. The conversion of methane into CO$_2$ and H$_2$O was already observed at 300° C. At 550° C. the conversion was 100%. In order to test the stability of the catalyst, the catalyst was pre-treated in a nitrogen flow (spatial rate of flow 3000 h$^{-1}$) for 6 hours at 1000° C. After the pre-treatment the catalyst was cooled to room temperature, and the reaction mixture (1% by volume of CH$_4$, 4% by volume of $O_2$, 95% by volume of $N_2$) was passed again over the catalyst. The activity of the catalyst was once more determined. No deactivation was established. Surprisingly, it was found that the activity of the catalyst had even been considerably enhanced as a result of the pre-treatment. At a temperature of 460° C. the conversion was already 100%.

EXAMPLE III 15 g of the stabilized carrier, the method of producing same being described in Example I, were suspended in 750 ml deionized water of 30° C. 6.04 g $CO(NO_3)_2.6H_2O$ were dissolved in 50 ml deionized water and added to the suspension. The suspension was vigorously stirred while nitrogen was blown under the liquid surface. The pH was adjusted to 4.8 with concentrated $HNO_3$. By injecting a 0.25 M NaOH solution (0.3 ml/min.) under the liquid surface, the pH was increased to 12.5. After 16 hours the catalyst was filtered off and washed twice with 25 ml deionized water. The catalyst was dried for 23 hours at 60° C. Finally, there was obtained a catalyst comprising 10% $Co_3O_4$ on $Al_2O_3$. The catalyst was subjected to the same test as described in Example II. No deactivation was established. After heating in an oxidizing gas no cobalt aluminate was shown in the X-ray diffraction pattern.

EXAMPLE IV 15 g of the stabilized carrier, the method of producing same being described in Example I, were suspended in 750 ml deionized water of 30° C. 5.70 g $Cu(NO_3)_2.3H_2O$ and 5.41 g $MN(NO_3)_2.4H_2O$ were dissolved in 50 ml deionized water and added to the suspension. The suspension was vigorously stirred while nitrogen was blown under the liquid surface. The pH was adjusted to 4 with concentrated HNO3. By injecting a 1 M NaOH solution (0.3 ml/min) under the liquid surface the pH was increased to 12. After 16 hours the catalyst was filtered off and washed twice with 25 ml deionized water. The catalyst was dried for 23 hours at 60° C. Finally, there was obtained a catalyst comprising 10% $CuO/8\% MnO_2$ on $Al_2O_3$.

The catalyst was subjected to the same test as described in Example II. No deactivation was found. Also, after conducting the test as described in Example I, no copper or manganese aluminate was shown.

EXAMPLE V 10 g stabilized carrier, the method of producing same being described in Example I with a loading of 0.5% by weight of $La_2O_3$ were suspended in 1.5 l deionized water of 25° C. As an electrolyte 7.84 g $K_2SO_4$ were added. Nitrogen was blown under the liquid surface. A copper anode and a platinum cathode were placed in the suspension. The pH was adjusted to 7, and for 4¾ hours a current of 8 mA/cm² was passed. The catalyst was then filtered off, washed twice with 25 ml deionized water and dried for 16 hours at a temperature of 60° C. There was obtained a 12% $CuO$ on $Al_2O_3$ catalyst. The stability of the catalyst was tested as described in Examples I and II. No deactivation or copper aluminate formation was observed. Again, the activity in the non-selective oxidation of methane was found to have been enhanced as a result of the pre-treatment at a high temperature.

COMPARATIVE EXAMPLES AND EXAMPLE VI

A stabilizer carrier was prepared according to the state of the art as described in the dissertation by Schaper (see page 41) by impregnating 20 g $\gamma$-$Al_2O_3$ with a lanthanum nitrate solution in such a manner that the final carrier comprised 0.5% by weight of $Al_2O_3$. The carrier was dried for 1 night at 60° C. and then calcined for 2 hours at 500° C. This carrier material was then impregnated with a copper nitrate solution to minimize the formation of aluminate so that after drying and calcining there was obtained a catalyst comprising 10% by weight of CuO on $Al_2O_3$.

(catalyst A, comparative).

According to the method of Example I a carrier was obtained, which after drying and calcining, comprised 0.5% by weight of $La_2O_3$. By means of homogeneous deposition precipitation 10% by weight of CuO was deposited on this carrier.

(catalyst B, Example VI)

Both catalysts were then heated for 6 hours at 1000° C. The catalysts were characterized by means of X-ray diffraction and electron diffraction. In the X-ray diffraction pattern of catalyst A (FIG. 1) strong peaks of $\alpha$-$Al_2O_3$ were visible, side by side with those of $\delta$-$Al_2O_3$. In the X-ray diffraction pattern of catalyst B (FIG. 1) only peaks of $\delta$-$Al_2O_3$ were visible.

In the electron diffraction pattern of catalyst A peaks of $\alpha$-$Al_2O_3$ and $CU$-$Al_2O_4$ (copper aluminate) were to be observed side by side with peaks of $\delta$-$Al_2O_3$. In the electron diffraction pattern of catalyst B only peaks of $\delta$-$Al_2O_3$ were visible.

This shows that catalyst A is only thermostabilized, while catalyst B is also stabilized against the reaction of the active component with the carrier material.

Starting from $\gamma$-$Al_2O_3$, a non-stabilized catalyst was obtained by impregnating and calcining with copper nitrate as described for catalyst A. The X-ray diffraction pattern of this non-stabilized catalyst (C) was determined (FIG. 2).

The identification of the peaks is given in the Table.

TABLE

| PEAK | CATALYST A | CATALYST B | CATALYST C |
|---|---|---|---|
| 1 | $\theta$-$Al_2O_3$ | $\theta$-$Al_2O_3$ | $\theta$-$Al_2O_3$ |
| 2 | $\alpha$-$Al_2O_3$ | $\theta$-$Al_2O_3$ | $\alpha$-$Al_2O_3$ |
| 3 | — | — | $\theta$-$Al_2O_3$ |
| 4 | $\theta$-$Al_2O_3$ | $\theta$-$Al_2O_3$ | $\alpha$-$Al_2O_3$ |
| 5 | — | — | $\theta$-$Al_2O_3$ |
| 6 | $\alpha$-$Al_2O_3$ | $\theta$-$Al_2O_3$ | $\alpha$-$Al_2O_3$ |
| 7 | $\theta$-$Al_2O_3$ | $\theta$-$Al_2O_3$ | $\theta$-$Al_2O_3$ |
| 8 | $\alpha$-$Al_2O_3$ | $\theta$-$Al_2O_3$ | $\alpha$-$Al_2O_3$ |
| 9 | $\theta$-$Al_2O_3$ | — | $\theta$-$Al_2O_3$ |
| 10 | $\alpha$-$Al_2O_3$ | — | $\alpha$-$Al_2O_3$ |
| 11 | $\theta$-$Al_2O_3$ | — | $\theta$-$Al_2O_3$ |
| 12 | $\alpha$-$Al_2O_3$ | — | $\alpha$-$Al_2O_3$ |
| 13 | $\alpha$-$Al_2O_3$ | — | $\theta$-$Al_2O_3$ |
| 14 | $\theta$-$Al_2O_3$ | — | $\alpha$-$Al_2O_3$ |
| 15 | $\alpha$-$Al_2O_3$ | — | — |

We claim:

1. A catalyst for conducting non-selective oxidation reactions, comprising: carrier material consisting mainly of alumina, if required in combination with one or more other metal oxides; the surface of said carrier material having applied thereto a catalytically active component consisting in a fine distribution of one or more oxides of one or more metals from the first series of transition elements of the Periodic Table; said carrier surface having applied thereto a stabilizing element on the basis of a metal or compound of a metal from subgroup 3 or 4 of the Periodic Table, said element being applied so uniformly that after treatment at 1050° C. for 6 hours the catalyst shows no diffraction maxima in the X-Ray diffraction pattern having a half-value width less than 1.0 degrees of arc (measured through the double angle of diffraction).

2. A catalyst according to claim 1, characterized in that after heating for 24 hours at 600° C. in an oxidizing gas the catalyst shows no or substantially no distinguishable lines of metal aluminate in the X-ray diffraction pattern.

3. A catalyst according to claim 1, characterized in that said carrier material consists of $Al_2O_3$.

4. A catalyst according to claim 1 characterized in that the catalytically active component applied is at least one oxide selected from the group consisting of oxides of Mn, Fe, Co, Ni, and Cu.

5. A catalyst according to claim 4 characterized in that the catalytically active component applied is at least one oxide selected from the group consisting of oxides of copper, nickel and cobalt.

6. A catalyst according to claim 5, characterized in that the catalytically active component applied is copper oxide.

7. A catalyst according to claim 1 characterized in that the stabilizing element applied is at least one material selected from the group consisting of lanthanum, the lanthanides, zirconium, titanium and compounds of said metals.

8. A catalyst according to claim 7, characterized in that the amount of the stabilizing element or the stabilizing compound calculated as an oxide ranges from 0.1 to 25% by weight, based on the carrier material.

9. A catalyst according to claim 2, characterized in that said carrier material consists of $Al_2O_3$.

10. A catalyst according to claim 2, characterized in that the catalytically active component applied is at least one oxide selected from the group consisting of Mn, Fe, Co, Ni and Cu.

11. A catalyst according to claim 3, characterized in that the catalytically active component applied is at least one oxide selected from the group consisting of Mn, Fe, Co, Ni and Cu.

12. A catalyst according to claim 9, characterized in that the catalytically active component applied is at least one oxide selected from the group consisting of Mn, Fe, Co, Ni and Cu.

13. A catalyst according to claims 9, 10, 11, or 12 characterized in that the stabilizing element applied is at least one material selected from the group consisting of lanthanum, the lanthanides, zirconium, and compounds of said metals.

* * * * *

UNITED STATES PATENT AND TRADEMARK OFFICE
CERTIFICATE OF CORRECTION

PATENT NO. : 4,968,660

DATED : November 6, 1990

INVENTOR(S) : Ivo I.M. Tijburg and John W. Geus

It is certified that error appears in the above-identified patent and that said Letters Patent is hereby corrected as shown below:

Column 1, line 53, "metals ar applicable" should read --metals are applicable--.

Column 4, line 34, "0.1μ" should read --0.1μm--.

Column 5, line 26, "Cobalt (ii)" should read --Cobalt (II)--.

Column 6, line 57, "βm" should read --μm--.

Column 6, line 60, "Nhd2" should read --$N_2$--.

Column 7, line 13, "C<u>O</u>" should read --CO--.

Column 7, line 13-14, "NO3" should read --$NO_3$--.

Column 7, line 38, "HNO3" should read --$HNO_3$--.

Column 8, line 15, "(catalyst A," should read --<u>(catalyst A,</u>--.

Column 8, line 21, "(catalyst B," should read --<u>(catalyst B,</u>--.

UNITED STATES PATENT AND TRADEMARK OFFICE
CERTIFICATE OF CORRECTION

PATENT NO. : 4,968,660

DATED : November 6, 1990

INVENTOR(S) : Ivo I.M. Tijburg and John W. Geus

It is certified that error appears in the above-identified patent and that said Letters Patent is hereby corrected as shown below:

Column 8, line 63, "comprising: carrier" should read
 --comprising: a carrier--.

Signed and Sealed this

Eighth Day of September, 1992

Attest:

DOUGLAS B. COMER

Attesting Officer

Acting Commissioner of Patents and Trademarks